Figure 5A:
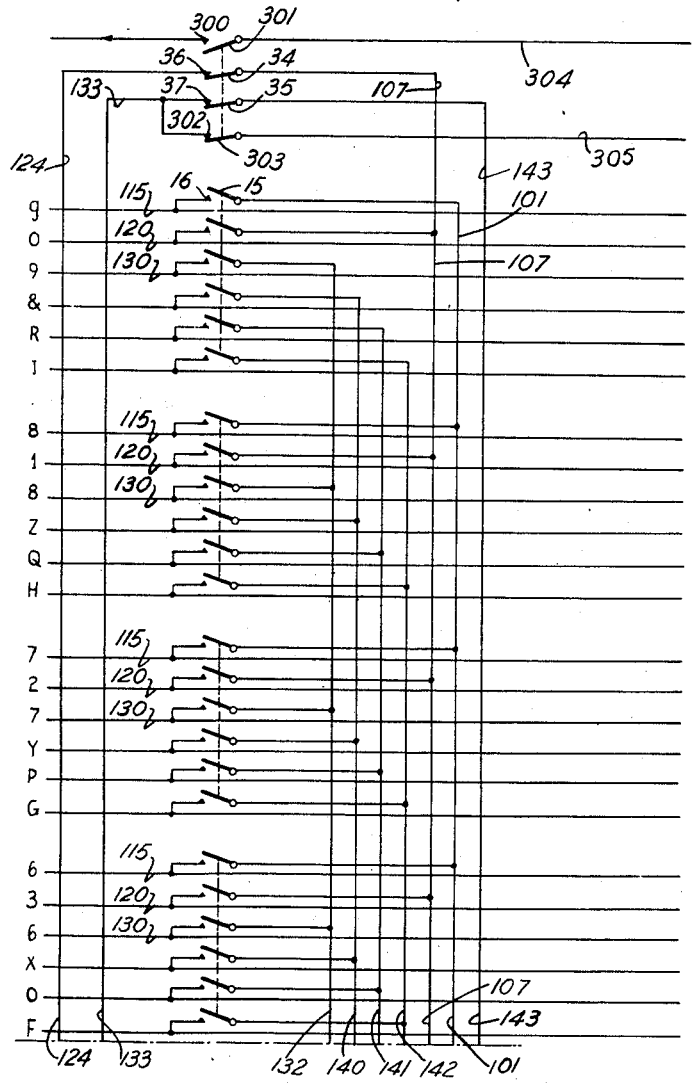

March 26, 1957 D. R. LAMBERT ET AL 2,786,630
RECORD-CONTROLLED STATISTICAL MACHINES
Filed April 15, 1954 11 Sheets-Sheet 1
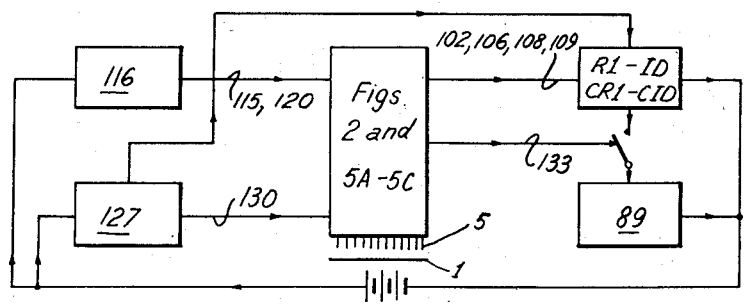
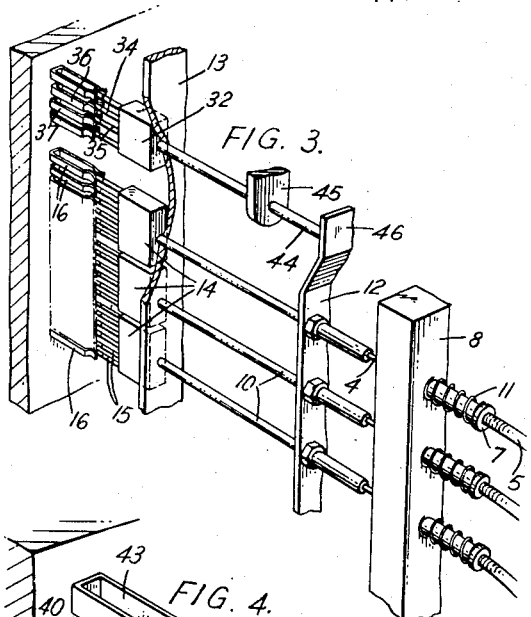
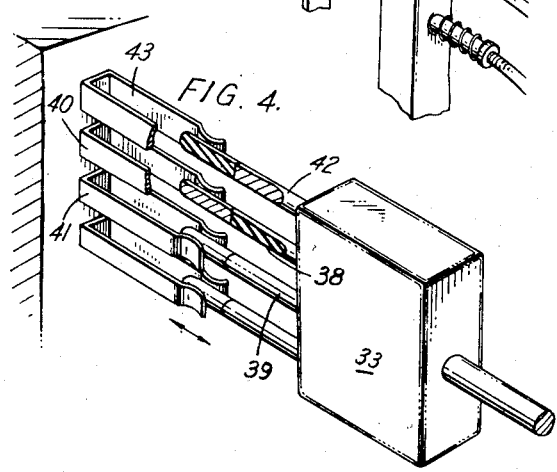
Inventors
DONALD R. LAMBERT & DONALD P. LAMBERT

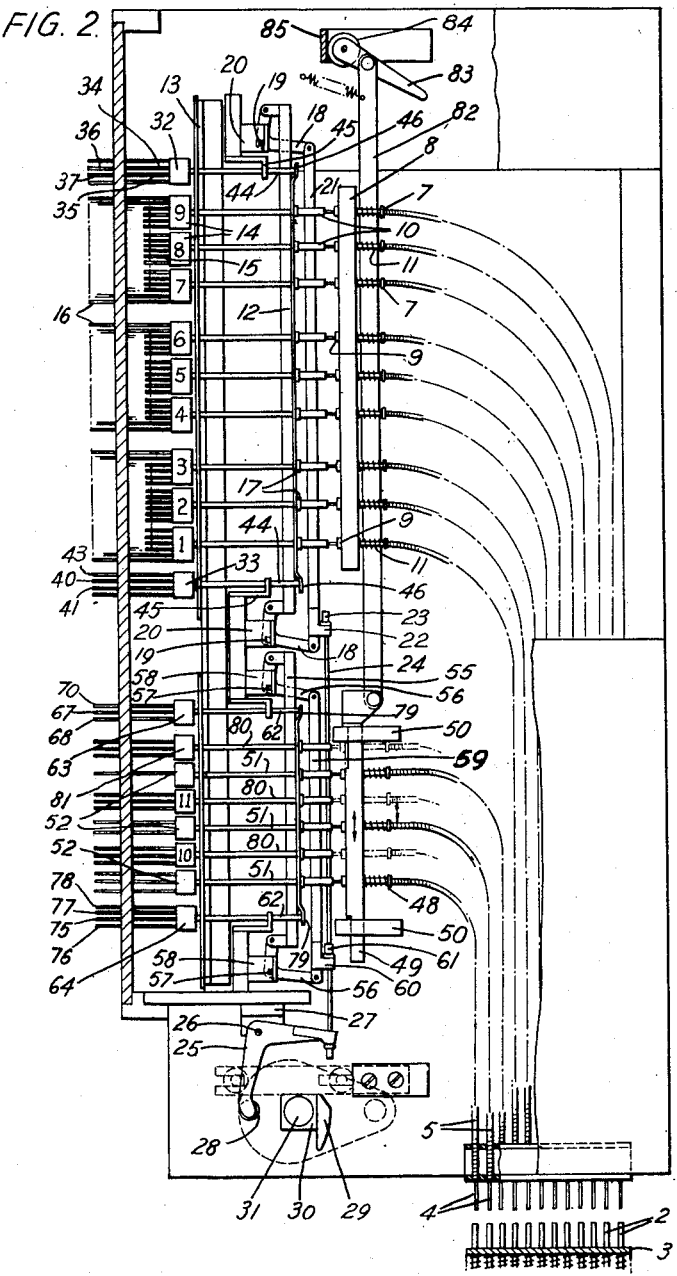

March 26, 1957  D. R. LAMBERT ET AL  2,786,630
RECORD-CONTROLLED STATISTICAL MACHINES
Filed April 15, 1954  11 Sheets-Sheet 3

Inventors
DONALD R. LAMBERT & DONALD P. LAMBERT,

March 26, 1957  D. R. LAMBERT ET AL  2,786,630
RECORD-CONTROLLED STATISTICAL MACHINES
Filed April 15, 1954  11 Sheets-Sheet 6

Inventors
DONALD R. LAMBERT & DONALD P. LAMBERT,
By
Attorneys

March 26, 1957   D. R. LAMBERT ET AL   2,786,630
RECORD-CONTROLLED STATISTICAL MACHINES
Filed April 15, 1954   11 Sheets-Sheet 8
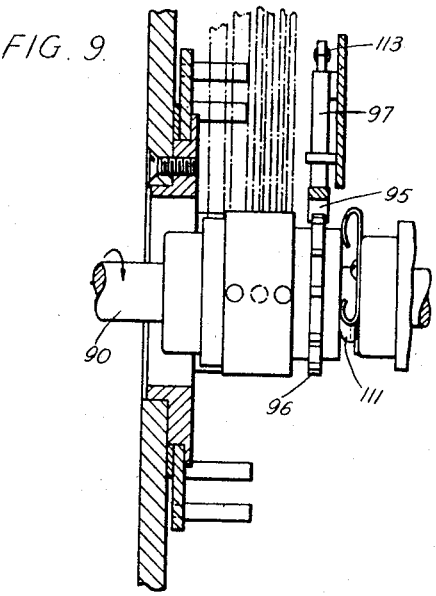
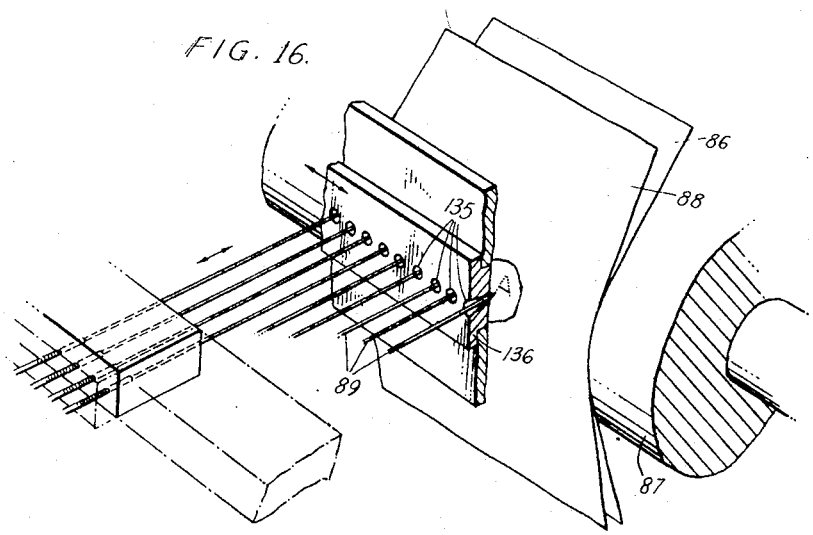
Inventors
DONALD R. LAMBERT & DONALD P. LAMBERT,
By March 26, 1957 D. R. LAMBERT ET AL 2,786,630
RECORD-CONTROLLED STATISTICAL MACHINES
Filed April 15, 1954 11 Sheets-Sheet 9

Inventors
DONALD R. LAMBERT & DONALD P. LAMBERT,

March 26, 1957  D. R. LAMBERT ET AL  2,786,630
RECORD-CONTROLLED STATISTICAL MACHINES
Filed April 15, 1954  11 Sheets-Sheet 10
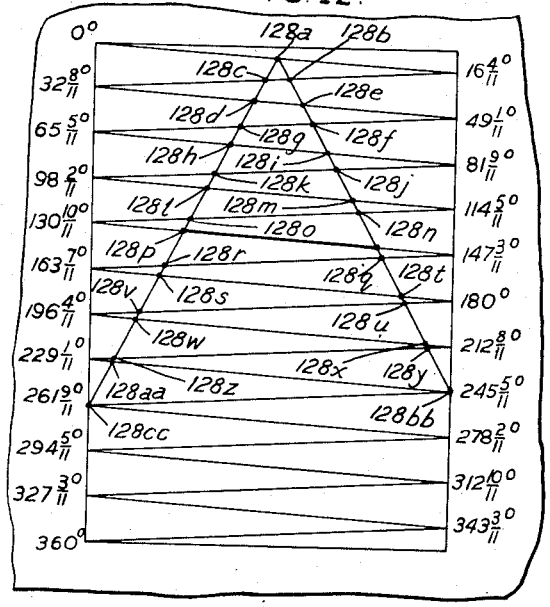
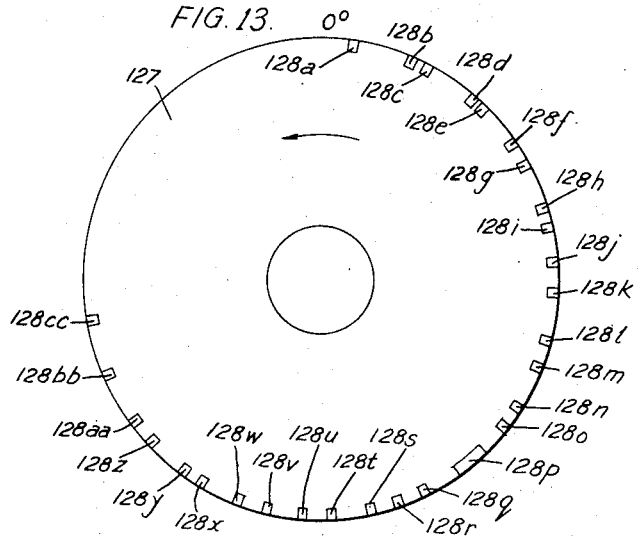
Inventors
DONALD R. LAMBERT & DONALD P. LAMBERT March 26, 1957 D. R. LAMBERT ET AL 2,786,630
RECORD-CONTROLLED STATISTICAL MACHINES
Filed April 15, 1954 11 Sheets-Sheet 11
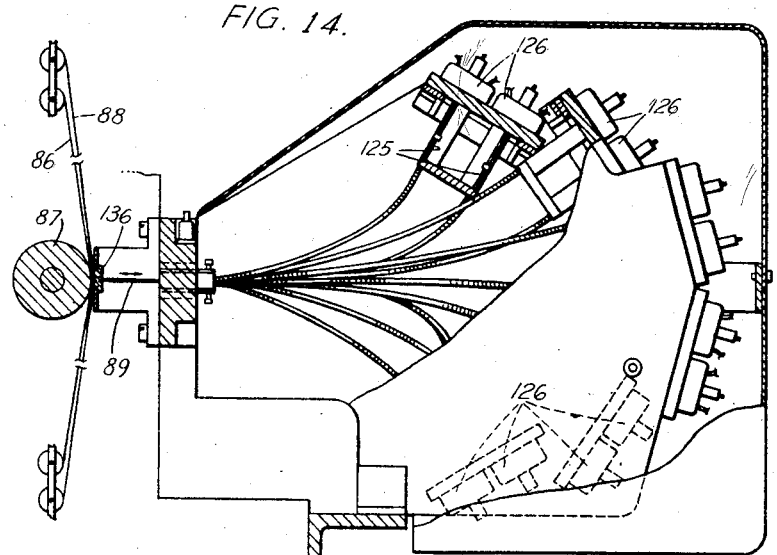
FIG. 14.
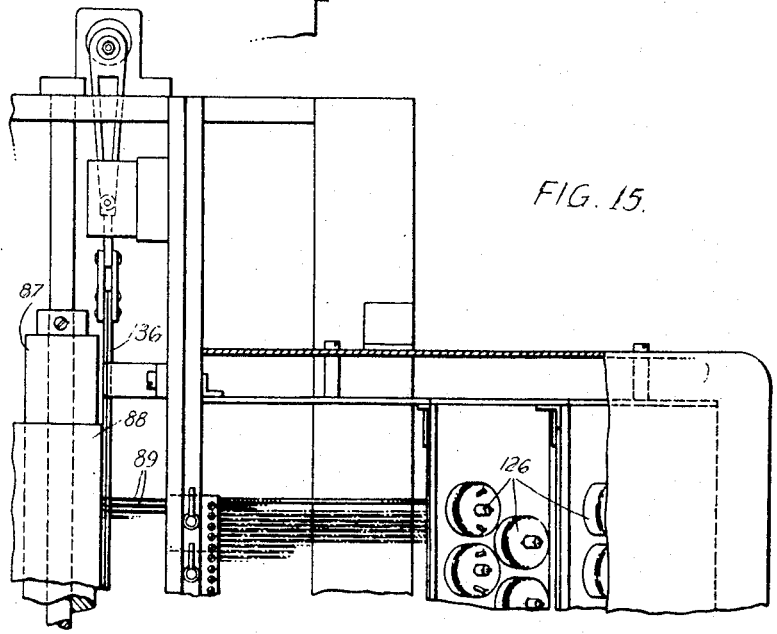
FIG. 15.
Inventors
DONALD R. LAMBERT & DONALD P. LAMBERT,
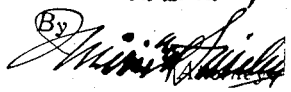

__

United States Patent Office 2,786,630
Patented Mar. 26, 1957

2,786,630

RECORD-CONTROLLED STATISTICAL MACHINES

Donald Rudolf Lambert and Donald Paul Lambert, Carshalton, England, assignors to Powers-Samas Accounting Machines Limited, London, England, a British company Application April 15, 1954, Serial No. 423,481

Claims priority, application Great Britain April 28, 1953

18 Claims. (Cl. 235—61.6)

This invention relates to statistical machines controlled by records such as perforated record cards or perforated tape or by cards, tape, or other data-bearing media on which data is recorded by marks, for example marks having magnetic properties or light-absorbing properties, and from which the data is sensed to control operations of the machines.

According to the present invention there is provided in a record controlled machine in which electrical circuits are conditioned by sensing means responsive to data recorded on a record, apparatus comprising for each of a plurality of columns of a record a first and a second group of switches each including normally open switches each connected electrically with a pulse-initiating device of predetermined significance and with at least one recording device, and at least one normally closed switch included in each said group and electrically connected with each other to control outputs through closed normally open switches, switch operating means appropriated to each normally open switch of a group and movable on receipt of a signal initiated by the sensing of data from a record to effect closing of the normally open switch appropriated thereto, auxiliary operating means connected with the switch operating means of a group and movable on actuation of any one of the switch operating means for a group of switches to effect opening of the normally closed switches of the group, restoring means common to said first and second groups of switches simultaneously to restore operated switches to the normal condition thereof, and manually operable switch means to control the outputs from circuits which include predetermined ones of the switches.

Figure 5B:
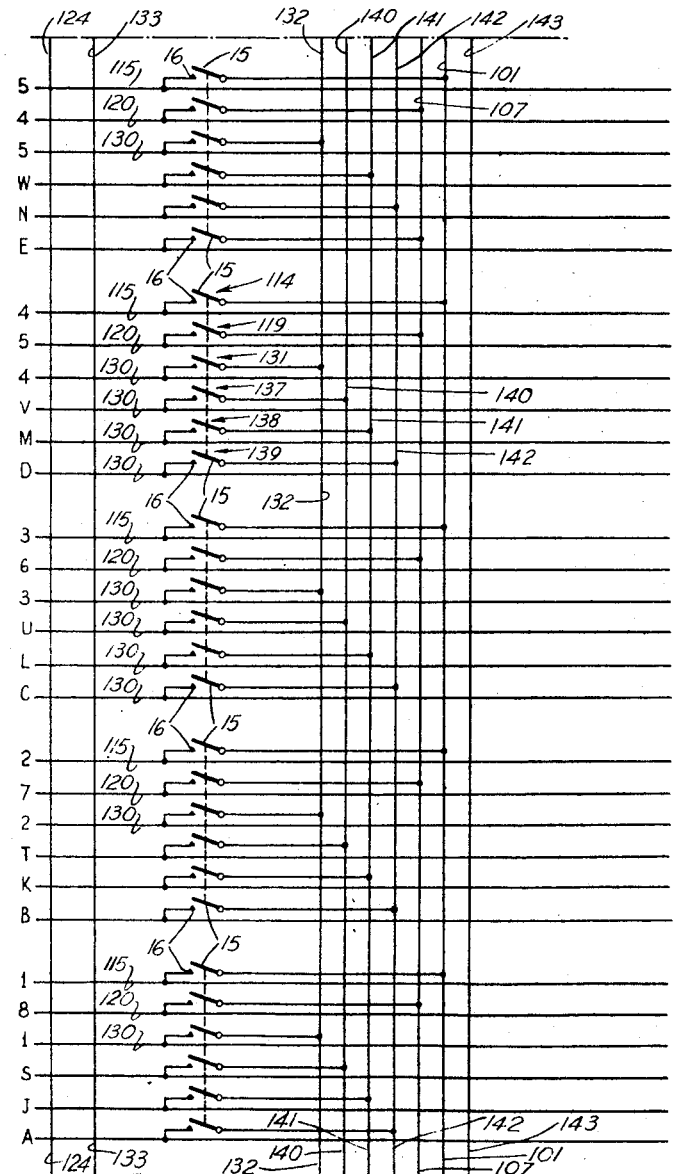
Figure 5C:
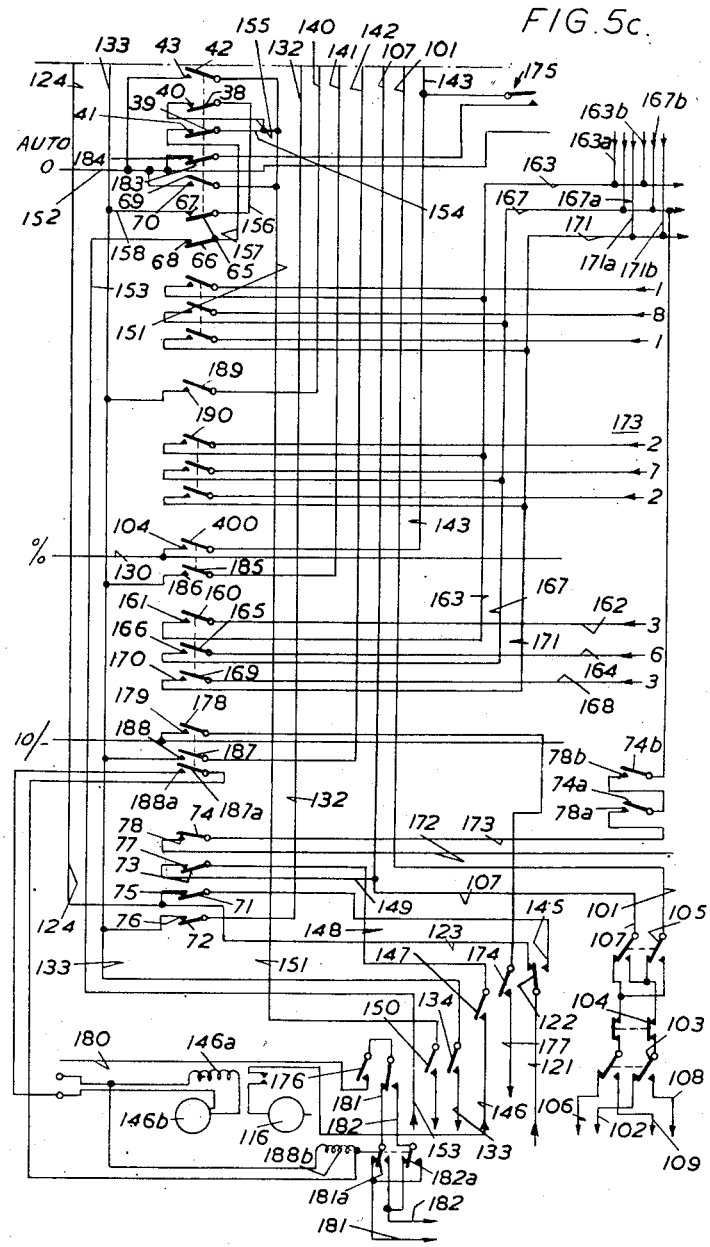
Figure 7:
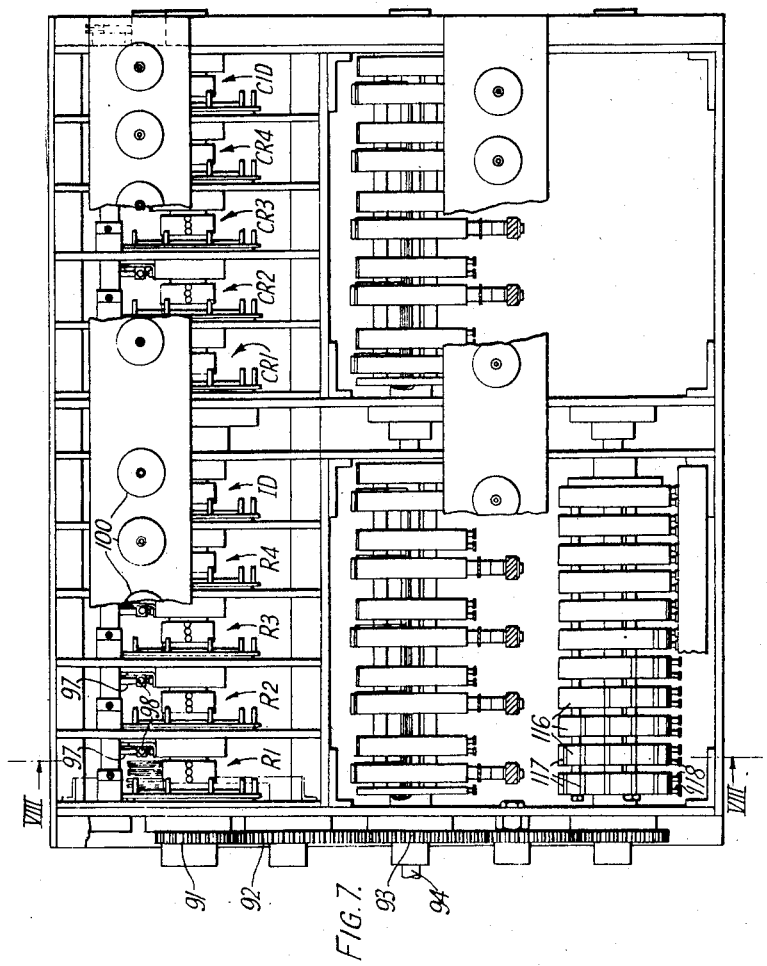
Figure 8:
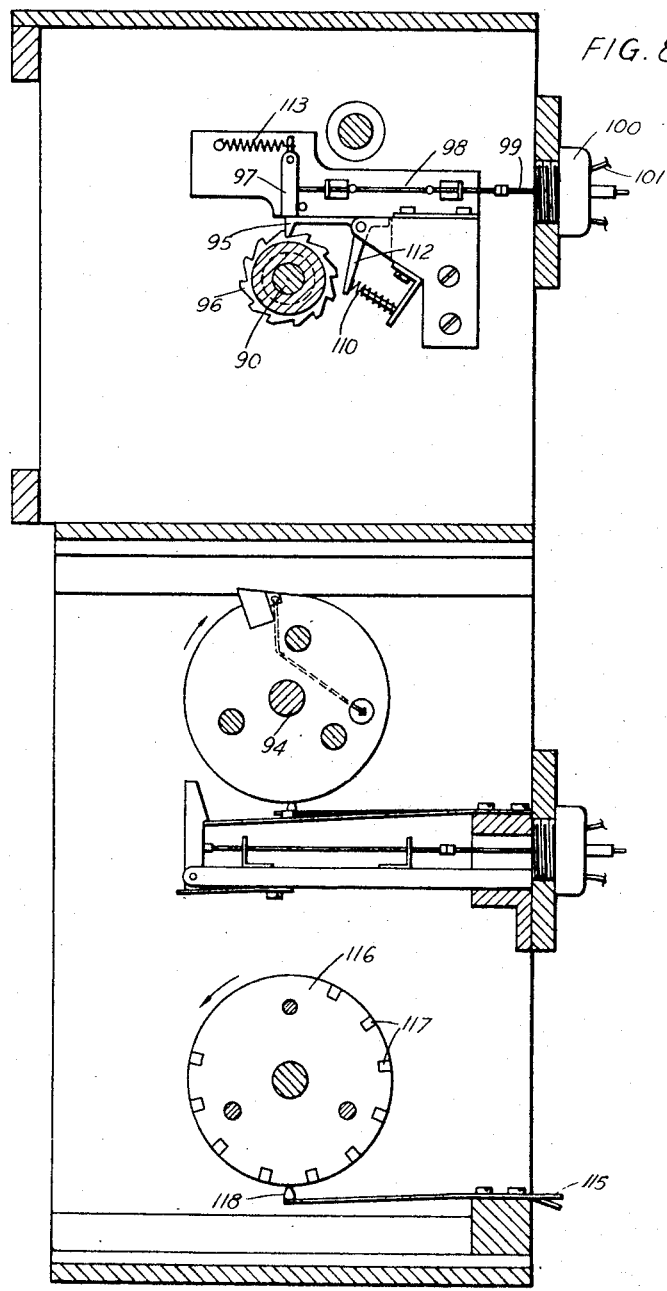
Figure 10:
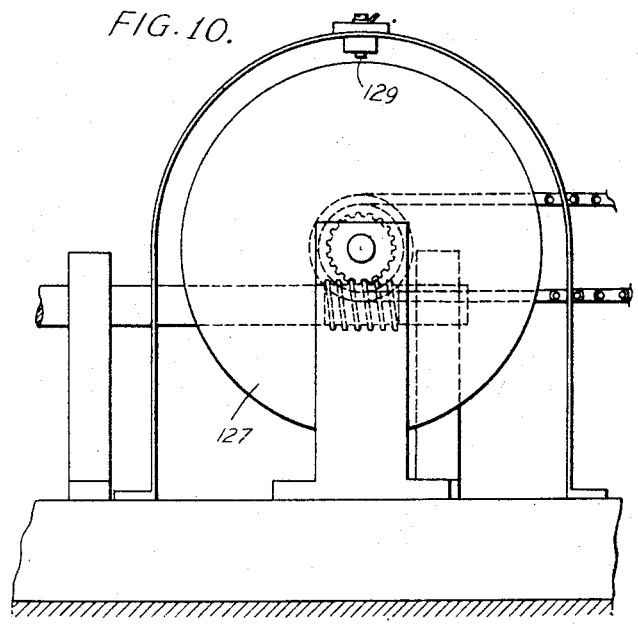
Figure 11:
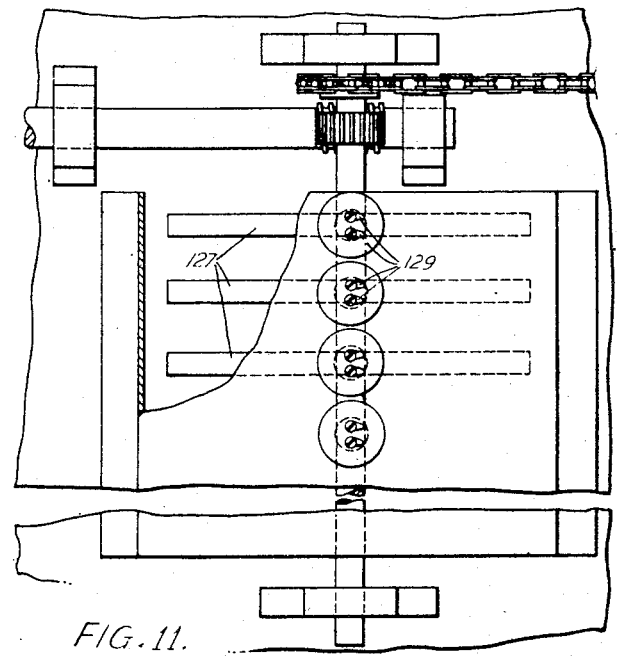

In order that the invention may be clearly understood, one embodiment thereof will now be described, by way of example, with reference to the accompanying diagrammatic drawings in which:

Fig. 1 is a block diagram of a device embodying apparatus according to the invention, Fig. 2 is an elevation, partly in section, of apparatus according to the invention, Fig. 3 is a pictorial view of part of the apparatus shown in Fig. 2, Fig. 4 is a pictorial view illustrating the construction of switches employed in the apparatus, Figs. 5A, 5B and 5C together are a circuit diagram showing the circuits controlled by the apparatus illustrated in Figs. 2 and 3, Fig. 6 is a portion of a statistical record card which may be employed in a machine embodying apparatus according to the invention, Fig. 7 is an elevation illustrating a counting register for co-operation with apparatus according to the invention, Fig. 8 is a section on line VIII—VIII, Fig. 7, Fig. 9 is an elevation illustrating one registering disc embodied in the counting register illustrated in Fig. 7, Fig. 10 is an end elevation of a pulse-initiating device co-operating with apparatus according to the invention and arranged to transmit character-determining pulses, Fig. 11 is a top plan of Fig. 10, Fig. 12 graphically illustrates the manner in which a stylus, under control of a character-determining disc, defines a character to be recorded, Fig. 13 illustrates a character-determining disc to control the definition of the character illustrated in Fig. 12, Fig. 14 is an end view, partly in section, of styluses for defining characters, Fig. 15 is a top plan of a part of Fig. 14, and Fig. 16 is a pictorial view illustrating the mode of operation of a stylus.

In the following description it will be assumed that apparatus according to the present invention is for control by perforated record cards although it is to be understood that the apparatus can be controlled by other forms of control media as mentioned above.

Referring to Fig. 1, a perforated record card 1 is fed by known means, not shown, to a sensing device of well known construction, not shown, which embodies columns of sensing pins arranged to set up transmission pins 2, Fig. 2, according to the pattern of perforations contained in the card being sensed. The set-up transmission pins 2 are locked in the set-up positions thereof so that on upward movement of a pin-box 3 supporting them they operate the inner members 4 of flexible elements 5, such as Bowden wires, arranged to co-operate therewith. In Fig. 2 only one column of pins 2 is shown, but it will be understood that a similar column of pins will be provided for each card column to be sensed and that all columns of pins are moved simultaneously by the pin-box 3.

The flexible elements 5 receive signals initiated by the sensing of data from a record card and, as a result of the receipt of such signals, control the making or breaking of electrical circuits to be described below with reference to Figs. 5A, 5B, and 5C.

As will be understood in the art, in record controlled machines data sensed from a record may comprise numbers for entry into a counting register or may comprise data in coded form for translation and recording as letters of the alphabet, or the data may comprise a combination of both numbers and letters. The numbers for entry into a counting register are directed to the appropriate denominations of the counting register and the sensed data representative of letters of the alphabet is decoded and employed to form a permanent visual record, for example on paper. If desired, the numbers transmitted for entry into the counting register may also comprise a part of the permanent visual record.

As is well understood in the art, the data sensed from one vertical column 6, Fig. 6, of a record card is normally transmitted to appear in one predetermined section of the counting register, or one predetermined line position on the visual record which is made as a result of the sensing of the record card. It will therefore be understood that, although in Fig. 2 there is illustrated only the apparatus for control by one card column 6, and Figs. 5A, 5B and 5C illustrate the electrical circuits for control only by the single column of apparatus shown in Fig. 2, there will be provided a column of apparatus and electrical circuits as illustrated respectively in Figs. 2 and 5A, 5B and 5C for each vertical column 6 which is to be sensed. As will hereinafter appear, the electrical circuits illustrated in Figs. 5A, 5B and 5C and the mode of operation of the apparatus shown in Fig. 5, can be predetermined according to the nature of the data contained in the card column 6 which is to control the column of apparatus shown in Fig. 2 and the electrical circuits co-operating therewith.

Referring to Figs. 2 and 3, the ends of the flexible elements 5 remote from the pins 2 are each housed in a sleeve 7 which extends through a plate 8, the sleeve 7 being externally screw-threaded and provided with a nut 9 by which the element 5 can be adjusted so as to position the end of the inner wire in relation to an axially movable operating rod 10. The sleeve 7 has a head and is surrounded by a spring 11 which extends between the head and the plate 8 to retain the sleeve in the adjusted position thereof.

The operating rods 10 extend through one side of a movable angle piece 12 and through one side of a fixed angle piece 13 and when in the restored positions thereof, as shown in Fig. 2, one end of each operating rod is engaged by the inner member 4 which co-operates therewith. The other end of the operating rod carries a block 14 supporting movable switch elements 15 for co-operation with the stationary switch elements 16 of a first group of switches. A signal received by a flexible element 5 on being transmitted by the inner member 4 thereof is communicated to the operating rod 10 with which it cooperates to effect axial movement thereof so that the switch elements 15 carried by the block 14 are moved relative to the stationary switch elements 16 to close the electrical circuits controlled thereby as will hereinafter be described.

As can be seen from Fig. 2, there are nine blocks 14, one for each of the data-indicating positions of a card column which positions are representative of the numbers "1" to "9." Accordingly, on sensing of a perforation representative of any of the digits "1" to "9" the appropriate block 14 will, by axial movement of its operating rod 10, effect closing of the switches controlled thereby. Each operating rod 10 has a nut 17 fitted thereto to engage the angle piece 12 to cause movement thereof towards the stationary switch elements 16 when any one of the operating rods is moved axially. To permit movement of the angle piece 12, the angle piece is, at the opposite ends thereof, pivoted to a bell-crank lever 18, the bell-crank levers being pivoted at 19 to fixed brackets 20. The bell-crank levers 18 also have pivotally connected thereto a link 21 carrying a lug 22 engaged by a sleeve 23 secured on an axially movable rod 24, axial movement of which is controlled by a bell-crank lever 25 pivoted at 26 to a fixed frame member 27. The lever 25 carries a roller 28 for engagement by a cam 29 secured to a square bar 30 supported for rotation by stub shafts 31 co-axial therewith. The stub shafts are, by any suitable means, not shown, under control from the main shaft for the machine rotated in timed relation with the movements of the pin-box 3. A cam 29, bell-crank lever 25, and rod 24 is provided for each column of apparatus similar to that shown in Fig. 2, but it will be understood that as each of the cams 29 is supported by the square bar 30 each of the bell-crank levers 25 and the rods 24 will be operated simultaneously to effect a restoring operation to restore to the positions shown in Fig. 2 any of the blocks 14 which may have been actuated by the flexible elements 5 co-operating therewith. It will be understood that movement of the angle piece 12 towards the stationary switch elements 16 by the axial movement of any operating rod 10 is permitted because, at the time when such movement is effected, the cams 29 are not engaged with the rollers 28 and the bell-crank levers 25 are accordingly moved counterclockwise, as viewed in Fig. 2, to permit the necessary counterclockwise movement of the bell-crank levers 18. When, however, the cams 29 are engaged with the rollers 28, the bell-crank levers 25 are rocked clockwise, thus pushing downwards the rods 24 and, through links 21, rocking the bell-crank levers 18 clockwise so that the angle pieces 12, together with any actuated blocks 14, are restored to the inactive positions thereof as illustrated in Fig. 2.

Co-operating with the blocks 14 are two blocks 32 and 33, of which the block 32 supports a first movable switch element 34 and a second movable switch element 35 for co-operation respectively with stationary switch elements 36, 37, forming part of the first group of switches. The block 33 also carries movable switch elements comprising a first auto-nought switch element 38, a second auto-nought switch element 39 for co-operation respectively with a first auto-nought stationary switch element 40 and a second auto-nought stationary switch element 41, the switches 38, 40 and 39, 41 respectively forming a first and a second normally closed auto-nought switch. Block 33 also carries two further moving switch elements of which one 42 co-operates with a stationary switch element 43 to form a first normally open auto-nought switch and the other will be referred to below. The switches operated by the block 33 form part of said first group of switches.

From Figs. 2, 3 and 4 it will be seen that the moving switch elements employed in the apparatus are at all times engaged by the stationary switch elements. Since, however, some of the switches are normally open and others are normally closed the moving switch elements, as diagrammatically illustrated in Fig. 4, are so constructed that a non-conducting portion of a moving switch element is normally engaged by a stationary switch element and movement of the moving element to the active position thereof causes a conducting portion of the element to be engaged by the stationary switch element and an opposite disposition of the conducting and non-conducting portions is employed for the moving switch elements forming part of normally closed switches.

The blocks 32, 33 are each carried by an auxiliary operating rod 44, the rods 44 being supported for axial movement by fixed brackets 45 and the angle piece 13. The ends of the rods 44 opposite the ends which support the blocks 32, 33 are engaged by out-set portions 46 on the angle pieces 12 and, accordingly, the rods 44 are moved axially each time any one of the operating rods 10 is moved axially as a result of a signal received by the flexible element 5 co-operating therewith.

The blocks 14 are, as stated above, operable as the result of signals initiated by the sensing in a card column of a perforation in any data-indicating position thereof representative of a digit "1" to "9," but, as is customary, each card column also includes three further data-indicating positions known in the art, and referred to hereinafter, as "over-punch positions" and when, in any column of a card, a perforation is punched in an over-punch position in combination with a perforation in one of the "1" to "9" data-indicating positions, such punching represents a character, such as a letter of the alphabet, according to a predetermined code. If, however, a perforation appears in an over-punch position without a perforation in one of the "1" to "9" positions, then the perforation in the over-punch position will have a predetermined significance which may be indicative for example of a control hole to control a machine operation or, if numbers in a column are recorded according to a duo-decimal notation, two of the over-punch positions may, as indicated in the pence column, Fig. 6, be representative of the numbers "10" and "11" respectively, or if an over-punch position contains a perforation in a card column representative of shillings, the over-punch position may represent tens-of-shillings. Predetermined over-punch positions may, as will hereinafter appear also have a still further significance in that three over-punch positions in each of three adjoining columns may be arranged to provide an additional column of data-indicating positions representative of digits "1" to "9," this being indicated in the portion of the card illustrated in Fig. 6, which portion is enclosed by a dotted square 47.

The flexible elements 5 to receive signals as the result of the sensing of perforations in the three over-punch positions of a card column have their inner ends supported by sleeves 48 similar to the sleeves 7 described above, the sleeves 48 being carried by a bar 49 supported for lengthwise movement in fixed brackets 50. In the positions normally occupied by the bars 49, the sleeves 48 occupy the positions illustrated in full line in Fig. 2 so that the inner members 4 of the flexible elements 5 are aligned and co-operate with operating rods 51 similar to the rods 10 described above, there being, as shown in Fig. 2, three rods 51, one for each of the three-over-punch positions in a card column. The operating rods 51 support blocks 52, each carrying movable switch elements for co-operation with stationary switch elements, these switches forming part of a second group of switches. The operating rods 51 are supported for axial movement by the angle piece 13 and also by a further movable angle piece 55 similar to the angle piece 12 described above. The angle piece 55 is supported for movement towards and away from the stationary switch elements of the second group by bell-crank levers 56 pivoted at 57 in fixed brackets 58 and connected to a link 59, which link has a lug 60, for engagement by a sleeve 61 secured to the axially movable restoring rod 24.

Co-operating with the rods 51 and the blocks 52 are two further auxiliary operating rods 62 respectively supporting blocks 63 and 64 of which the block 63 carries movable switch elements 65, 66, for co-operation with stationary switch elements 67, 68 to form respectively a third and a fourth normally closed auto-nought switch. Block 63 also carries a movable switch element 69 for co-operation with a stationary switch element 70 to form a second normally open auto-nought switch. The block 64 carries moving switch elements 71, 72, 73, and 74 for co-operation with stationary switch elements 75, 76, 77 and 78 to form respectively a first, a second, a third, and a fourth normally closed switch comprising part of the second group of switches.

The operating rods 62 are engaged by out-set portions 79 formed on the angle piece 55 so that the operating rods 62 are moved axially each time any one of the three operating rods 52 is moved axially by the inner member 4 which co-operates therewith. From Fig. 2 it will be understood that actuated operating rods 52 and 62 will be restored to the inactive positions thereof simultaneously with the restoring of any actuated operating rods 10 and 44. It will, however, be understood that the rods 10 and 44 can be operated without corresponding operation of any of the operating rods 52 and 62, or the operating rods 52 and 62 can be operated without corresponding operation of any of the rods 10 and 44, or the operating rods 10, together with the operating rods 44 can be operated simultaneously with an operating rod 52 and an operating rod 62.

When the column of apparatus illustrated in Fig. 2 is to be conditioned to operate as a duo-decimal column or to receive signals from the three over-punch positions contained in one of the card columns within the box 47, then prior to the operation of the machine the bar 49 is raised from the position shown in Fig. 2 so that the sleeves 48 supported thereby occupy the chain-line positions indicated in Fig. 2 in which positions they co-operate with operating rods 80 each of which supports a block 81 carrying movable switch elements, described below, for co-operation with stationary switch elements of the second group thereof.

To condition the bar 49 it has connected thereto a link 82 to the upper end of which is pivoted a lever 83 for manual operation, the lever 83 being connected with an eccentric roller 84 engaged by a fixed abutment 85 so that, on upward movement of the link 82 by lever 83, the sleeves 48 and flexible elements carried thereby are moved to, and supported in, the chain line positions shown in Fig. 2.

Figs. 5A, 5B and 5C together are a circuit diagram showing the electrical circuits controlled by the column of apparatus illustrated in Fig. 2 and, as stated above, the circuits associated with the column of apparatus shown in Fig. 2 can be selectively conditioned to perform a number of different functions. To facilitate the understanding of the mode of operation of the circuits, under control of the apparatus, the various functions which can be pre-selected will now be described under separate descriptive headings.

*Recording decimal digits*

When the record card contains data comprising an amount according to the decimal notation, a digit sensed from a card column can be transmitted for entry into a counting register and a simultaneous transmission can be effected to apparatus arranged to define a visual representation of the digit sensed from the card. Fig. 7 illustrates a counting register to which digits sensed can be transmitted and Figs. 14 to 16 illustrate a character-defining device by which characters can be defined on a continuously moving web of paper 86, the paper web being fed at a constant linear speed over a platen 87, together with a web of transfer media such as a carbon ribbon 88, definition of each character being effected by a stylus 89 under control of the apparatus illustrated in Fig. 2 and the appropriate circuits of Fig. 5. It will be understood that entries to the counting register are made to the appropriate denomination thereof according to the card column sensed and likewise the column of apparatus shown in Fig. 2 controls a stylus 89 appropriate thereto.

The counting register illustrated in Fig. 7 comprises a true-figure registering section consisting of denominational registering discs R1, R2, R3, R4 and an indicator disc ID. The particular mode of operation of the counting register is immaterial to the understanding of the present invention and the operation thereof will not be described in detail, but only in so far as is necessary to the understanding of the mode of operation of the apparatus according to the present invention. In the construction shown in Fig. 7, the counting register is designed for registering sterling amounts, the disc R1 being to register pence, the disc R2 to register units of shillings, the disc R3 to register tens-of-shillings, and the disc R4 to register units of pounds. It will be understood that a number of other registering discs may be provided to the right of disc R4, such other discs being to register denominations of pounds higher than that of the units denomination registered by disc R4. It will also be understood that if the registering device is to register only decimal numbers then each of the individual registering discs will be appropriated to the one denominational value as, for example the disc R1 will register digits according to $10^0$, disc R2 will register digits according to $10^1$, disc R3 will register digits according to $10^2$, disc R4 will register digits according to $10^3$ and further registering discs can be provided, if desired, to register higher denominations.

Briefly, each registering disc is freely mounted on a shaft 90, Fig. 8, continuously rotated by gear wheels 91, 92, 93, Fig. 7, the gear wheel 93 being supported on a shaft 94 continuously rotated by means, not shown, from the main drive of the machine. Each disc is normally retained in stationary position relative to the shaft 90 by a pawl 95 which engages with a toothed wheel 96 secured to the disc. The pawl 95 is retained in engagement with a tooth of the wheel 96 by a latch 97 spring-urged to the latching position thereof shown in Fig. 8. The latch is engaged by a wire 98 co-operating with the armature 99 of a moving coil solenoid 100 which is connected with a number-output line 101, Fig. 5C, through a line 102 and manually operable switches 103, 104, and a selectively operable automatic switch 105. From Fig. 5C it will be observed that to the left of the line 102 is a further line 106 which line, through switches 103, 104, and 105, is connected with a complement-output line 107. The complement-output line is connected to the appropriate registering disc of a complement-registering section of the counting register shown in Fig. 7, the registering discs of which are indicated as CR1, CR2, CR3, CR4 respectively. The lines 102 and 106 are considered as each being connected with a registering disc for registering digits according to the decimal notation, as for example the discs R2, CR2 which register units of shillings, and two further lines 108 and 109 are respectively a number-output line and a complement-output line for connection with discs for registering numbers according to the duo-decimal notation, as for example the discs R1, CR1 which record pence. It will therefore be understood that if, prior to the operation of the machine, the column of apparatus is to control a decimal registering disc, the manual switch 103 will be positioned as illustrated in Fig. 5C, whereas if it is predetermined that the column is to control a duo-decimal registering disc, the switch 103 is reversed prior to the operation of the machine. Alternatively, if it is decided that, although numbers sensed from the card are to be recorded by a stylus 89, they are not to be entered into the counting register, then prior to the operation of the machine the manually operable switch 104 will be operated to interrupt the connection between lines 101, 107, 102 and 106.

The automatic switch 105 is normally positioned as shown in Fig. 5C, but is reversed under control of a control hole in a record card, such control hole indicating that the amount recorded in the card is to be subtracted from the amount registered in the counting register. This switch, as a result of the sensing of said control hole is reversed so that pulses representative of the sensed figure pass along line 101 to line 106 or 109, according to the position of switch 103, and the pulses representative of the complement of the sensed figure are transmitted along line 107 to line 102 or 108. By this means the complement is added to the true-figure registering section of the counting register and the true figure is added to the complement-registering section, thus resulting in a subtraction operation.

As each pulse representative of a digit is passed along line 102 it energises the moving coil 100 so that the wire 98 is moved axially thereby to move the latch 97 counter-clockwise as viewed in Fig. 8, thus releasing the pawl 95 which, due to the action of a spring 110, is disengaged from the toothed wheel 96. On disengagement of the pawl 95 from the wheel 96, a friction clutch 111, Fig. 9, movable with shaft 90, rotates the toothed wheel and the disc connected thereto by a distance of one tooth pitch by which time the tail 112 of a pawl 95 has been depressed by engagement with a tooth of wheel 96 so that the pawl 95 is again disengaged to arrest the wheel 96 and the latch 97, under the action of a spring 113, is restored to latching relation with the pawl 95. It will be understood that if, for example, the digit "5" is sensed from a card, five successive discrete pulses will be passed along line 102 so that the moving coil 100 in quick succession is actuated five times thereby resulting in the wheel 96 being advanced in a clockwise direction by five tooth positions. Of course, the registering device comprises a carry device and is also provided with read-out devices, but such devices form no part of the present invention and will not be described herein.

Let it be assumed that, as mentioned above, a perforation is sensed in the number "5" position of a card column and that the switches 103, 104, and 105 are in the positions illustrated in Fig. 5C so that the circuit is conditioned to transmit number-representing pulses to a registering disc of the appropriate decimal denomination. On sensing of the card the appropriate flexible element 5 will be actuated to emit a signal to the operating rod 10 having at its end the block 14 appropriated to the digit "5." Accordingly, this block will be moved to the left, as viewed in Fig. 2, together with the blocks 32 and 33, thus closing the switches controlled by the number "5" block 14 and reversing the normal conditions of the switches controlled by blocks 32 and 33. Referring to Fig. 5B, the first or true-figure switch 114 connects a line 115 with a pulse-initiating device comprising one of a plurality of discs 116, Figs. 7 and 8 continuously rotated by gear wheel 93 on shaft 94. The disc 116 with which the line 115 is connected in this instance carries five peripheral contacts 117, whereby, as each engages a contact 118, a discrete pulse is transmitted along line 115, through switch 114, to the line 101 and thence to the moving coil solenoid 100. It will be observed that the number-output line 101 is common to each of the digit-pulse input lines 115.

As the number sensed from the card was "5" the five discrete pulses will be transmitted to the appropriate registering disc of the true-figure registering section of the counting register, and also there is transmitted to the complement-registering section four discrete pulses representative of the complement to nine of the digit "5." These digit-representing pulses are initiated by the second or complement switch 119 which connects a line 120 with the disc 116 having four contacts 117 thereon. The pulses along line 120 pass through the switch 119 to the complement-output line 107 which is common to all the complement-input lines 120.

It will be understood that in some instances no digit will be sensed for registering in the true-figure registering section of the counting register and although in such circumstances no entry will be made to the true-figure registering section, it will be necessary to transmit to the complement-registering section of the counting register nine digit-representing pulses representative of the complement to nought. As is customary no perforation is made in a card column when the amount is zero and so during the sensing operation none of the flexible elements 5 will transmit a signal to the column of apparatus shown in Fig. 2. Accordingly, no pulses will pass through any of the normally open switches of the first and second groups of switches and the nine pulses for transmission to the complement-registering section of the counting register are transmitted through a disc 116 along a first complement-input line 121, Fig. 5C, through a manually operable switch 122, which is in the position illustrated in Fig. 5C, to a line 123 connected with the first normally closed switch 71, 75 of the second group of switches and thence by a line 124 and the first normally closed switch 34, 36 of the first group of switches to the complement-output line 107.

A character is defined by a stylus 89, the stylus comprising the inner wire of a flexible element, such as a Bowden wire, which is connected at one end to the reciprocable armature 125 of a moving coil solenoid 126, Fig. 14, which is energised by the receipt of pulses from any selected one of a number of continuously rotatable character-determining discs 127, Figs. 10, 11, and 13. Each character-determining disc is provided with peripheral contacts 128a . . . 128cc, Fig. 13, which co-operate with electrical brushes 129, Figs. 10 and 11, the brushes 129 being connected by lines 130, Fig. 5B, to the normally open third or character switch 131. The switch 131 is connected by a line 132 with the second normally closed switch 72, 76, the switch 72, 76 also being connected by a character-output line 133 which is the output line to the moving coil solenoid 126 which controls the definition of a character by the stylus co-operating therewith. If desired, a manually operable switch 134 can be included in the line 129 whereby, if desired, this line can be opened so that on sensing of a digit from a card, although the digit can be entered into the counting register, no record will be made by the stylus 89.

In order that the pulses imparted to the stylus 89 to cause axial movement thereof may effect the definition of a character, the marking end of the stylus protrudes through an aperture 135, Fig. 16, in a plate 136 supported for reciprocation lengthwise of the platen 87, the extent of reciprocation being such as to define the maximum width of a character to be defined by the stylus, the maximum height of the character being defined by the speed of movement of the paper 86 which, as stated above, is moved in relation to the stylus at a constant linear speed. It will be understood that each stylus under control of the circuits shown in Figs. 5A, 5B, and 5C can be controlled to define any one of a plurality of characters, such characters including, in the example described herein, the numbers one to eleven and the twenty-six letters of the alphabet together with an ampersand. Figs. 12 and 13 illustrate respectively the definition of a letter "A" by a stylus and a character-disc fitted with contacts spaced for the definition of the letter "A."

As can be seen from Fig. 12 the end positions of the marking end of the stylus in relation to the angular movement of disc 127, as indicated by the reference 0° . . . 360°, are so selected that for one revolution of a character-determining disc 127 twenty-two paths are traced in space by the marking end of the stylus relative to the paper web 86. Of these twenty-two paths, sixteen are applied to the formation of characters and the remaining six are blank and represent an interval during which the data sensed from a record card is transmitted by the column of apparatus shown in Fig. 2.

The electrical contacts 128a . . . 128cc are so disposed around the periphery of the disc 127 that at intervals and for purposes determined thereby a solenoid 126 is energised and through its armature causes the marking end of the stylus to impinge against the marking ribbon 88 so that, according to the length of the contact, a dot or a line is marked on the paper web 86. In Figs. 12 and 13 the reference numerals 128a . . . 128cc indicate the contacts and the dots or lines marked as a result thereof.

It will be observed that simultaneously with the closing of the normally open switches 114, 119, and 131, a fourth switch 137, a fifth switch 138, and a sixth switch 139, all of which are normally open, are also closed. These three last mentioned switches also condition lines 130 connected to character-determining discs 127 but these switches are connected respectively with lines 140, 141 and 142 which are connected with switches of the second group of switches, the circuits controlled by such switches at this time being open because none of the operating rods 51 or 80 has been operated. Accordingly the circuits including switches 137, 138 and 139 are open so that no pulses pass to a stylus.

Recording duo-decimal numbers

When the apparatus is to record duo-decimal numbers, the circuits for the duo-decimal column are pre-conditioned by reversing the manually operable switch 103 and also the switch 122 from the positions thereof as shown in Fig. 5C and the lever 83 is operated so that the sleeves 48 are raised to the chain line positions thereof indicated in Fig. 2 in order that signals from the over-punch positions of the card column will be imparted to the operating rods 80. If with the circuit so conditioned any number from "1" to "9" is sensed from the card then the mode of recording will be the same as that described above as none of the operating rods 51 will be actuated. Further, to maintain the input and output pulses resulting from the sensing of a perforation in the number "10" or "11" positions of the appropriate card column separate from those resulting from the sensing of perforations in the number "1" to "9" positions thereof the pulses resultant from the sensing of the number "10" or "11" positions pass through a plug, not shown, which is inserted into a predetermined location in a plug-board, not shown, so that the output pulses are transmitted along lines 101 or 107, as appropriate, to register the number in the counting register and along line 133 to the appropriate character-defining device. It will be understood that another similar plug for use when the column is to be conditioned for boxing, as described below, will at this time be disconnected from the plug-board. If it is assumed that the number "10" is sensed from the card, then ten discrete pulses will be transmitted through the plug and plugboard and along lines 163 and 101 to the true-figure registering section of the counting register, and a single pulse will be transmitted through the plug and plug-board and along lines 167 and 107 to the complement registering section of the counting register, this single pulse being the complement to eleven of the sensed number "10." A visual record of the sensed number "10" will be made by the stylus under control of pulses initiated by the character-determining disc 127 for the character "10," the pulses being transmitted to the solenoid 126 through the plug and plug-board and along lines 171 and 133.

Since, however, the column is now conditioned to record duo-decimal numbers in the counting register the numbers transmitted to the complement registering section of the counting register must be the complement of the sensed number in relation to "11" and not to "9" as previously described. Thus, if none of the operating rods 10, 51, or 80 are operated, indicating that no amount is recorded in the card column, eleven pulses must be transmitted to the complement registering section of the counting register. Nine of these pulses pass along line 121 through switch 122 to a line 145, thence through normally closed switch 71, 75, line 124 and switch 34, 36 to the complement output line 107. Two further pulses pass along a line 146, Fig. 5C, through the contacts of a relay 146a, from a disc 116 having two contacts 117, and a manually operable switch 147, which is closed prior to commencement of operation of the machine, and thence by a line 148 to the third normally closed switch 73, 77 and along line 149 to the complement output line 107. A rotary switch 146b conditions the relay 146a when the said nine impulses have been transmitted.

Automatic noughts

With the circuits conditioned to record amounts in the counting register and to make a visual record of amounts sensed from record cards, if no perforation is sensed in a card column, indicating a zero value, no visual record will be effected under control of the apparatus shown in Fig. 2 since, in such instances, none of the operating rods will be operated. If, therefore, as is sometimes desired, a printed record is to be made when a card column contains no perforation, and is therefore indicative of a zero value, because of its relation with other card columns, it is customary to provide means for automatically recording such zero values and the zeros so recorded are known in the art as "automatic noughts." The circuits which co-operate with a column of apparatus as illustrated in Fig. 2 can be conditioned to effect the recording of "automatic noughts" and when this is to be done a manually operated switch 150, Fig. 5C, is closed in an indicator-output line 151. The indicator-output line 151 is connected with the first and second normally open auto-nought switches 42, 43 and 69, 70, these two switches being also connected with a line 152 which is connected to a nought-defining character disc 127. The indicator-output line 151 is connected to the auto-nought circuit of the next lower denominational column to which it acts as an input line and, in Fig. 5C, such a line which comes from the auto-nought circuit of next higher denomination is indicated by the reference 153 and is connected with line 151 by the normally closed auto-nought switches 66, 68, and 39, 41. The second normally closed auto-nought switch 39, 41 is connected with the indicator-output line 151 by a line 154 and the first normally closed auto-nought switch 38, 40 is connected with the line 154 by a line 155. The first normally closed auto-nought switch 38, 40 is also connected by a line 156 with the third normally closed auto-nought switch 65, 67 and the second normally closed auto-nought switch 39, 41 is connected with the fourth normally closed auto-nought switch 66, 68 by a line 157. The third switch 65, 67 is connected with the charatcer-output line 133 by a line 158 and the fourth switch 66, 68 is connected with the line 153. If none of the operating rods of the apparatus shown in Fig. 2 has been operated as the result of a sensing the output from the automatic nought circuit of the next higher denomination passes along line 153 through switch 66, 68, line 157, switch 39, 41, lines 154, 155 and switch 38, 40, line 156 and switch 65, 67 to the character-output line 133, thus controlling the definition of a zero by the stylus appropriated to the circuit.

It will be understood that an output from a column of higher denomination is received by a line 153 from the nought-determining character-determining disc 127, but if one of the operating rods 10 has been actuated the first and second switches 38, 40 and 39, 41 will be open and the switch 42, 43 will be closed. In such circumstances the input along line 153 will not pass through the second switch 39, 40 and will consequently be inactive, but output to the automatic nought circuit of next lower denomination is effected because switch 42, 43 is closed and such output is therefore obtained from line 152.

If one of the operating rods 51 or 80 has been actuated then the third and fourth switches 65, 67 and 66, 68 will be open and the switch 69, 70 closed, consequently the output along line 153 will not pass through the fourth switch 66, 68. In this instance, however, the output along line 151 is effected from line 152 through switch 69, 70 since, at this time, switch 42, 43, is open.

In circumstances in which an operating rod 10 and an operating rod 51 or 80 has been actuated each of the switches 38, 40; 39, 41; 65, 67; and 66, 68 is open and both of the switches 42, 43 and 69, 70 are closed. Accordingly, the input along line 153 does not pass through switch 66, 68 but the output to line 151 is received from line 152 through either of the closed switches 42, 43 or 69, 70. From the foregoing, it will be understood that it is only when all four switches 38, 40; 39, 41; 65, 67; and 66, 68 are closed and both switches 42, 43 and 69, 70 are open that pulses received along line 153 are transmitted along the character-output line 133 to effect the definition of a zero. It will, therefore, be understood that by closing the appropriate switches 150 it is possible to obtain the definition of zeros in columns to the right of a predetermined column when the controlling card columns contain no perforations. It will also be understood that, if desired, the apparatus may be conditioned to define zeros in columns to the left of a predetermined column where the controlling card columns contain no perforations.

Automatic Characters

If the apparatus is not required to provide automatic noughts, each column may include a normally open switch 300, 301 and a normally closed switch 302, 303, Fig. 5A, of which switch 300, 301 is connected to the preceding column and to the input line 304 from a character determining disc for a character such as £ or $ and the switch 302, 303 is connected with the character output line 133 and with a line 305 from the preceding column. Thus if the controlling card column contains no perforation the input along line 305 passes to line 133 to effect definition of said character whereas if the card column contains a perforation the switch 302, 303 is opened and switch 300, 301 is closed to connect the special character input line 304 to the preceding column of switches.

Boxing

In the foregoing description reference was made to the employment of the over-punch positions contained in the box 47, Fig. 6, as an additional column. In Fig. 6 it has been assumed that the card field for the amount normally has columnar provision for pence, shillings, and three denominations of pounds. If it is desired to have a card column in which to record one further higher denomination of pounds, such column is obtained by the use of the over-punch positions in the box 47. The circuits shown in Figs. 5A, 5B, and 5C can, by the use of a plug and plug-board, be conditioned to accommodate this additional requirement, but it will be understood that three such sets of circuits will be required to obtain the additional column of digits since in any one card column only three such additional digits are provided. It will be understood that the three columns of circuits so appropriated can still be employed in the manner described above to control the recording of digits "1" to "9" sensed from the respective columns of the card.

In the description of boxing with reference to Fig. 5C it will be assumed that the circuits are to control the recording of the digits "1," "2," and "3" in the additional card column 47. The output lines are connected in parallel with those of the two adjoining columns of circuits so that digit-representing pulses initiated by the sensing of a perforation in any one of the three over-punch positions in any one of the three-adjoining card columns pass along the same output line, as appropriate, to the true-figure registering section of the registering device, to the complement registering section thereof, and to the moving coil solenoid to control the stylus for defining the digits sensed from the card.

Prior to commencement of operation of the machine the lever 83 is operated so that the sleeves 43 are raised to the chain line positions thereof indicated in Fig. 2 in order that signals from the over-punch positions of the card column will be imparted to the operating rods 80 and the boxing plug, not shown, is inserted into the appropriate position in the above mentioned plug-board to control inputs and outputs resultant from sensing of perforations in card column 47. It will be understood that at this time none of the three columns will be conditioned as a duo-decimal column.

As an example of the mode of operation of the apparatus on the sensing of a perforation in the box 47, Fig. 6, let it be assumed that a perforation is sensed in the number "3" data-indicating position of the box. The operating rod 51 for the block 52 representative of digit "3" is actuated so that the normally open switches 160, 161 are closed and two digit-representing pulses from the appropriate pulse-initiating disc 116, under control of the plug and plug-board, pass along line 162 to an output line 163 whereby the pulses are transmitted to the true-figure registering section of the registering device. Digit-representing pulses from the pulse-initiating disc 116, also under control of the plug and plug-board, representative of digit "6" pass along line 164, through switch 165, 166, to an output line 167 by which the digit-representing pulses are transmitted to the complement registering section of the registering device. Character-representing pulses from the appropriate character-determinating disc 127, under control of the plug and plug-board, pass along a line 168 through switch 169, 170 to a character-output line 171 which transmits them to the appropriate moving coil solenoid 126. From Fig. 5C it will be seen that corresponding output lines 163a, 163b, 167a, 167b, 171a and 171b from the two adjoining columns of circuits are connected in parallel through the plug and plug-board with the output lines 163, 167, and 171.

In the event that the circuit is conditioned for boxing and no perforation is sensed in any of the over-punch positions in the box 47, nine pulses will be transmitted to the complement-registering section of the registering device but, in this instance, will not be transmitted along the line 121. The said nine pulses transmitted when no perforation is sensed in the box 47 pass from the appropriate pulse-initiating device 116 along a line 172 through the switch 74, 78, which will be closed as no perforation has been sensed in an over-punch position, and thence to an output line 173 connected, through the plug and plug-board, to the output line 167. From Fig. 5C it will be observed that switches 74a, 78a, and 74b, 78b for the two adjoining columns of circuits are connected in series with the switch 74, 78, thus, if a perforation is sensed in any of the nine over-punch positions in the box 47 one of the switches 74, 78; 74a, 78a; or 74b, 78b will be opened and no pulses will pass along the output line 173.

Recording shillings

If a column of circuits shown in Figs. 5A, 5B, and 5C is conditioned to control the recording of shillings, prior to the commencement of operation of the machine, the manually operable switches 144 and 150 are closed as also are three further manually operable switches 174, 175, and 176, Fig. 5C. The switch 174 is included in an output line 177 to the solenoid 126 of next higher denomination than that which is visually to record units of shillings since the stylus controlled by the output line 177 is to record tens-of-shillings and is controlled by a normally open switch 178, 179, Figs. 2 and 5C of the second group of switches.

To record tens-of-shillings a single pulse representative of tens-of-shillings is transmitted from the appropriate pulse-initiating disc 116 along a line 180, Fig. 5C, and thence to an output line 181 to the true-figure registering section of the registering device or along a second output line 182 to the complement-registering section of the registering device. The line 181, 182 along which the output passes is determined by an automatically operable switch 183 controlled by the sensing or otherwise of a perforation in the number "10" position of the card column appropriated to the recording of shillings. If the registering operation is one of subtraction this is indicated by a control perforation in the card sensing of which results in a switch 187a, 188a of the second group being closed thereby to energise a relay 188b which controls change-over contacts 181a, 182a so that the sensed amount of ten shillings is entered into the complement registering section instead of into the true-figure registering section of the counting register and on sensing of no perforation in the tens-of-shillings position of the card a pulse will be transmitted to the true-figure registering section.

If during a sensing operation a perforation is sensed in the number "10" position of the shillings column of the card and also in one of the number "1" to "9" positions thereof, the tens-of-shillings will be registered in the registering device in the manner just described by a pulse transmitted along output line 181 or 182 and the other digit sensed will be transmitted to the registering device as described above, along output lines 101, 107. The visual recording of the amount sensed is, as regards the tens-of-shillings controlled by the switch 178, 179, as mentioned above, and the digit representative of units-of-shillings is recorded by pulses transmitted along line 133 as above described. In the event that the sum of ten shillings is sensed from the card column, the visual record thereof is made by pulses transmitted along line 177 and the zero is recorded by pulses transmitted along line 133, under control of a normally closed switch 183, 184, Fig. 5C, the input being received along line 152 and passing to line 143 and thence to the line 133 through the switch 175.

Recording characters other than numbers

When the column of circuits is to be conditioned for use with a card column in which a character such as a letter of the alphabet is to be recorded by the punching of two holes in the column, one of which will be in one of the number "1" to "9" positions and the other in one of the over-punch positions, the circuits are conditioned, prior to operation of the machine, by the closing of switch 134, each of the other manually operable switches, including switch 122, being in the condition thereof as shown in Fig. 5C. As an example of the operation of the circuit when so conditioned, let it be assumed that a perforation is sensed in the card column in the position thereof which controls operation of the block 52, Fig. 2, which operates switches 189, 190, Fig. 5C, and also in the number "3" position thereof.

Resulting from the sensing the operating rod 10 for the number "3" position and the operating rod 51 for the number "10" position will be actuated. Character-defining pulses will pass along the lines 130 for the characters "U," "L," and "C," the pulses along the "L" and "C" lines 130 being transmitted respectively to the lines 141, 142, but not being transmitted to the output line 133 because the switches 185, 186; 187, 188 connecting lines 141 and 142 with lines 133 are open. Pulses along the "U" line 130, however, will pass to line 133 because the switch 189, 190 is closed by the operation of the operation rod 51. Accordingly the pulses passed along line 133 will be effective so as to control the stylus so that the stylus forms the letter "U." It will be understood that if, instead of the switch 189, 190 having been closed together with the switches for the number "3" position, the switch 185, 186 had been closed then the character defined would have been an "L," and had the switch 187, 188 been closed the character defined would have been a "C."

Sensed characters of special significance

If desired, a perforation in an over-punch position in a predetermined card column may represent a character of special significance such as %. To permit this switches 400, 401, Fig. 5C, of the second group of switches are connected to a line 130 from the appropriate character-determining disc so that character-defining pulses pass to line 143. As no card perforation has been sensed to effect operation of the switches of the first group the switches 35, 37 will be closed and the character-defining pulses along line 143 will pass to line 133 through the closed switches 35, 37.

From the foregoing it will be understood that a column of apparatus as illustrated in Fig. 2 together with the column of electrical circuits controlled thereby as illustrated in Figs. 5A, 5B and 5C can by pre-selection be conditioned to perform any of the functions described above. Thus, by providing one said column of apparatus and circuits for each card column to be sensed, each column of circuits can be pre-conditioned according to the format of the cards which are to be sensed.

We claim:

1. In a record controlled machine including sensing means responsive to data recorded on a record, electrical circuits to be conditioned by said sensing means, pulse-initiating devices each of predetermined significance, and recording devices for actuation under control of said pulse-initiating devices, apparatus comprising for each of a plurality of columns of a record a first and a second group of switches each including normally open switches each connected electrically with one of said pulse-initiating devices and with at least one of said recording devices, at least one normally closed switch included in each said group and electrically connected with each other to control output through closed normally open switches, switch-operating means appropriated to each normally open switch of a group and movable on receipt of a signal initiated by said sensing means to close the normaly open switch appropriated thereto, auxiliary operating means connected with the switch operating means of a group and movable on actuation of any one of the switch operating means for a group of switches to effect opening of the normally closed switch of the group, restoring means common to said first and second groups of switches simultaneously to restore operated switches to the normal conditions thereof, and manually operable switch means to control the outputs from circuits which include predetermined ones of the switches.

2. In a record controlled machine including sensing means responsive to data recorded on a record, electrical circuits to be conditioned by said sensing means, pulse-initiating devices each of predetermined significance and a counting register including a plurality of denominational sections for actuation under control of said pulse-initiating devices, apparatus comprising for each denominational section of the counting register a first and a second group of switches each including normally open switches of which predetermined ones of the first group are true-figure switches connected electrically to a denominational section of the counting register appropriated thereto and to a pulse-initiating device arranged to transmit to the counting register pulses representative of a predetermined numerical value and the others of the switches are connected with a pulse-initiating device and at least one of the recording devices, normally closed switches in each of said groups of which a switch of one group is electrically connected with one of the other group to control outputs through normally open true-figure switches when the latter are closed, a number output line common to all said true-figure switches and connecting the output circuits for said switches to the counting register, switch-operating means appropriated to each normally open true-figure switch and movable on receipts of a signal initiated by said sensing means to close the normally open true-figure switch appropriated thereto, auxiliary operating means connected with the switch operating means of a group and movable on actuation of any one of the switch operating means for a group of switches to effect opening of the normally closed switches of the group, restoring means common to said first and second groups of switches simultaneously to restore operated switches to the normal conditions thereof, and manually operable switch means including a notation-determining switch in said number output line selectively to connect the line to a decimal or to a duodecimal section of the counting register.

3. Apparatus according to claim 2, including a character-defining device, a normally open character switch for each true-figure switch, said character switch being electrically connected with said character-defining device and with a pulse-initiating device arranged to transmit to the character-defining device pulses to define a character representative of a number transmitted along said number-output line, and a character-output line common to all said character switches and along which pass the character-determining pulses.

4. Apparatus according to claim 3, including non-numerical character-determining pulse-initiating devices, three normally open non-numerical character switches for cooperation with each true-figure switch of said first group of switches, normally open character-control switches to connect said non-numerical character determining switches with said character-output line and with said non-numerical character-determining devices so that when a true-figure switch of said first group and a character-control switch of the second group is in the closed condition thereof a character-defining device is caused to define a predetermined character other than a number.

5. Apparatus according to claim 4, including selectively operable conditioning means to condition predetermined ones of the switch-operating means for said second group of switches to receive signals initiated by said sensing means, and a manually operable switch in the character-output line to permit or prevent outputs to the character-defining device.

6. Apparatus according to claim 5, including auxiliary output lines common to the normally open switches of the second group of switches appropriated to three record columns, predetermined ones of the normally open switches of one of said second groups being connected with said auxiliary output lines and corresponding predetermined ones of the normally open switches of each of the other two of said second groups being connected in series with said auxiliary lines.

7. Apparatus according to claim 6, including an indicator output line from the switch arrangement for one denominational section of the counting register to the next higher section thereof, a first and a second normally open auto-nought switch each electrically connected to said indicator line and to a nought-defining element of said character-determining pulse-initiating device, a first, a second, a third, and a fourth normally closed auto-nought switch of which the first and second are electrically connected one with the other and with the indicator output line and the first is connected with the third and and the second with the fourth, said third switch being also connected with the character output line and the fourth switch with the indicator output line for the switches appropriated to the counting register section of next lower denomination whereby when either normally open auto-nought switch is closed a pulse is passed along the indicator output line to the section of next higher denomination, but when neither of the normally open auto-nought switches is closed a pulse along the indicator line of next lower denomination passes to the character-output line to control definition of a nought by the character-defining device, and a manually operable switch in each said indicator line to condition the line to pass pulses to the section of next higher denomination.

8. Apparatus according to claim 5, including an indicator output line from the switch arrangement for one denominational section of the counting register to the next higher section thereof, a first and a second normally open auto-nought switch each electrically connected to said indicator line and to a nought-defining element of said character-determining pulse-initiating device, a first, a second, a third, and a fourth normally closed auto-nought switch of which the first and second are electrically connected one with the other and with the indicator output line and the first is connected with the third and the second with the fourth, said third switch being also connected with the character output line and the fourth switch with the indicator output line for the switches appropriated to the counting register section of next lower denomination whereby when either normally open auto-nought switch is closed a pulse is passed along the indicator output line to the section of next higher denomination, but when neither of the normally open auto-nought switches is closed a pulse along the indicator line of next lower denomination passes to the character-output line to control definition of a nought by the character-defining device, and a manually operable switch in each said indicator line to condition the line to pass pulses to the section of next higher denomination.

9. In a record controlled machine including sensing means responsive to data recorded on a record, electrical circuits to be conditioned by said sensing means, pulse-inititing devices each of predetermined significance, and a counting register including a true-figure registering section and a complement registering section each having a plurality of like denominational sections for actuation under control of said pulse-initiating devices, apparatus comprising for each denominational section of the counting register a first and a second group of switches each including normally open switches of which predetermined ones of the first group are true-figure switches connected to a denominational section of said true-figure registering section and to a pulse-initiating device arranged to transmit to said denominational section, and others of the normally open switches of the first group are complement switches connected to a denominational section of the complement registering section which is of the same denomination as that of said denominational section of the true-figure registering section, normally closed switches in each of said groups of which a switch of one group is electrically connected with one of the other group to control outputs through said normally open switches when the latter are closed, a number output line common to all said true-figure switches and connecting the output circuits for the true-figure switches to the true-figure registering section, a complement output line common to all complement switches and connecting the output circuits for the complement switches to the complement registering section, switch-operating means appropriated to each normally open switch of a group and movable on receipt of a signal initiated by said sensing means to close the normally open switch appropriated thereto, auxiliary operating means connected with the switch operating means of a group and movable on actuation of any one of the switch operating means for a group of switches to effect opening of the normally closed switches of the group, restoring means common to said first and second groups of switches simultaneously to restore operated switches to the normal conditions thereof, and manually operable switch means including notation-determining switches in said number output lines selectively to connect the line to a decimal or to a duo-decimal section of the counting register.

10. Apparatus according to claim 9, including non-numerical character-determining pulse-initiating devices, three normally open non-numerical character switches for co-operation with each true-figure switch of said first group of switches, normally open character-control switches to connect said non-numerical character determining switches with said character-output line and with said non-numerical character-determining devices so that when a true-figure switch of said first group and a character-control switch of the second group is in the closed condition thereof a character-defining device is caused to define a predetermined character other than a number.

11. Apparatus according to claim 10, including selectively operable conditioning means to condition predetermined ones of the switch-operating means for said second group of switches to receive signals initiated by said sensing means, and a manually operable switch in the character-output line to permit or prevent outputs to the character-defining device.

12. Apparatus according to claim 11, including auxiliary output lines common to the normally open switches of the second group of switches appropriated to three record columns, predetermined ones of the normally open switches of one of said second groups being connected with said auxiliary output lines and corresponding predetermined ones of the normally open switches of each of the other two of said second groups being connected in series with said auxiliary lines.

13. Apparatus according to claim 12, including an indicator output line from the switch arrangement for one denominational section of the counting register to the next higher section thereof, a first and a second normally open auto-nought switch each electrically connected to said indicator line and to a nought-defining element of said character-determining pulse-initiating device, a first, a second, a third, and a fourth normally closed auto-nought switch of which the first and second are electrically connected one with the other and with the indicator output line and the first is connected with the third and the second with the fourth, said third switch being also connected with the character output line and the fourth switch with the indicator output line for the switches appropriated to the counting register section of next lower denomination whereby when either normally open auto-nought switch is closed a pulse is passed along the indicator output line to the section of next higher denomination, but when neither of the normally open auto-nought switches is closed a pulse along the indicator line of next lower denomination passes to the character-output line to control definition of a nought by the character-defining device, and a manually operable switch in each said indicator line to condition the line to pass pulses to the section of next higher denomination.

14. Apparatus according to claim 11, including an indicator output line from the switch arrangement for one denominational section of the counting register to the next higher section thereof, a first and a second normally open auto-nought switch each electrically connected to said indicator line and to a nought-defining element of said character-determining pulse-initiating device, a first, a second, a third, and a fourth normally closed auto-nought switch of which the first and second are electrically connected one with the other and with the indicator output line and the first is connected with the third and the second with the fourth, said third switch being also connected with the character output line and the fourth switch with the indicator output line for the switches appropriated to the counting register section of next lower denomination whereby when either normally open auto-nought switch is closed a pulse is passed along the indicator output line to the section of next higher denomination, but when neither of the normally open auto-nought switches is closed a pulse along the indicator line of next lower denomination passes to the character-output line to control definition of a nought by the character-defining device, and a manually operable switch in each said indicator line to condition the line to pass pulses to the section of next higher denomination.

15. Apparatus according to claim 11, in which each group of switches includes a first and a second normally closed switch, and including a first complement input line connected with said complement output line through the first normally closed switch of each said group of switches and with a pulse-initiating device arranged to transmit along said first complement input line pulses representative of digit nine, a second complement input line connected with said common complement output line through the second normally closed switch of the second group of switches and with a pulse-initiating device arranged to transmit along said second complement input line pulses representative of digit two, and a manually operable switch in each said complement input line of which the switch in the first complement input line is arranged in one condition thereof to permit the transmission of pulses representative of digit nine to the complement registering section of the counting register when no entry is made to the true-figure registering section thereof and said common complement output line is connected to a decimal denomination of the complement registering section, and in the other condition thereof permits the transmission of such pulses to the complement registering section when no entry is made to the true-figure registering section and the common complement output line is connected to a duo-decimal denomination of the complement registering section, the switch in the second complement input line being in one condition thereof arranged to prohibit transmission of pulses along the second complement input line and in the other condition thereof permitting the transmission of pulses representative of digit two for addition to the pulses representative of digit nine along said first complement input line when the common complement-output line is connected to a duo-decimal denomination of the complement registering section of the counting register.

16. Apparatus according to claim 15, including a switch automatically operable to reverse outputs along said common number-output line and common complement output line whereby pulses representative of a complement are transmitted to the true-figure registering section and pulses representative of a true-figure are transmitted to the complement registering section thereby to effect a subtracting operation.

17. In a record controlled machine including sensing means responsive to data recorded on a record, electrical circuits to be conditioned by said sensing means, pulse-initiating devices each of predetermined significance, and at least one recording device for actuation under control of said pulse-initiating devices, apparatus comprising for each of a plurality of columns of a record a first and a second group of switches each including normally open switches each electrically connected with one of said pulse-initiating devices, at least one normally closed switch included in each said group and electrically connected with each other to control outputs through closed normally open switches an operating rod for each of a plurality of normally open switches to be closed simultaneously by the operating rod therefor, an actuating element for each said rod operable by a sgnal initiated by the sensing means, at least one auxiliary operating rod to effect opening of normally closed switches of a group of switches, a first connecting element movable by operation of any operating rod co-operating with normally open switches of said first group and engaging an auxiliary operating rod co-operating with normally closed switches of the first group to effect operation of the auxiliary rod on operation of any one of the operating rods for said first group, a second connecting element movable by operation of any operating rod co-operating with normally open switches of said second group and engaging an auxiliary rod co-operating with normally closed switches of the second group to effect operation of the auxiliary rod on operation of any of the operating rods for said second group, a restoring link co-operating with each connecting element, a cam-operated restoring member connecting said restoring links for simultaneous operation, and manually operable switch means to control the outputs from circuits which include predetermined ones of the switches.

18. Apparatus according to claim 17, including a support for the actuating elements for operating rods co-operating with switches of said second group, said support being movable to and from one or other of two positions thereof to position the actuating elements for co-operation with predetermined ones only of the operating rods, and a lever and link connected with the support to effect said movements thereof.

References Cited in the file of this patent
UNITED STATES PATENTS
2,513,112     Shepherd _____ June 27, 1950